(12) United States Patent
Daniel

(10) Patent No.: US 9,120,360 B2
(45) Date of Patent: Sep. 1, 2015

(54) AMPHIBIOUS VEHICLE

(76) Inventor: Guirec Daniel, Perros Guirec (FR)

( * ) Notice: Subject to any disclaimer, the term of this patent is extended or adjusted under 35 U.S.C. 154(b) by 43 days.

(21) Appl. No.: 14/234,237

(22) PCT Filed: Jun. 29, 2012

(86) PCT No.: PCT/EP2012/062660
§ 371 (c)(1),
(2), (4) Date: Apr. 25, 2014

(87) PCT Pub. No.: WO2013/013930
PCT Pub. Date: Jan. 31, 2013

(65) Prior Publication Data
US 2014/0308859 A1 Oct. 16, 2014

(30) Foreign Application Priority Data
Jul. 22, 2011 (FR) ...................................... 11 56676

(51) Int. Cl.
*B63B 3/00* (2006.01)
*B60F 3/00* (2006.01)
*B63C 13/00* (2006.01)

(52) U.S. Cl.
CPC ............... *B60F 3/0007* (2013.01); *B60F 3/003* (2013.01); *B63C 13/00* (2013.01); *B60F 2301/04* (2013.01)

(58) Field of Classification Search
CPC ........... B60F 3/00; B60F 3/0007; B60F 3/003
USPC ................. 440/12.52, 12.54, 12.66
See application file for complete search history.

(56) References Cited

U.S. PATENT DOCUMENTS 2,890,466 A 6/1959 Bly
3,085,261 A 4/1963 Kennedy
(Continued)

FOREIGN PATENT DOCUMENTS

| FR | 2 782 696 | 3/2000 |
| GB | 798 956 | 7/1958 |
| GB | 2 419 326 | 4/2006 |

OTHER PUBLICATIONS

English translation of the Written Opinion of the International Searching Authority dated Feb. 15, 2014.
(Continued)

*Primary Examiner* — Lars A Olson
(74) *Attorney, Agent, or Firm* — Nixon & Vanderhye, PC

(57) ABSTRACT

The invention concerns an amphibious vehicle (100) comprising:
a chassis (102) having a housing (106a) having an opening (202) having edges,
for said housing (106a), a handling device (108a) having a fixed part (210) fixed to the chassis (102) and a movable part (104a) mounted so as to be able to move on the fixed part (210) and comprising among other things a wheel (104a), the movable part (104a) being able to move between a running position wherein the wheel (104a) is outside the housing (106a), and a retracted position wherein the wheel (104a) is in the housing (106a), and
a hatch system (204) having a hatch (206), designed to adopt alternately an open position in which it does not close off the opening (202) or a closed position in which it comes into abutment against the edges of the opening (202) and closes it off at least partly,
the movable part (104a) being designed to be moved into a locking position in which a locking element (104a) of the movable part (104a) locks the hatch (206) in the closed position by abutment thereof against the hatch (206).

11 Claims, 5 Drawing Sheets

(56) References Cited

U.S. PATENT DOCUMENTS

| | | | | |
|---|---|---|---|---|
| 3,421,472 | A | * | 1/1969 | Oberg .......................... 114/344 |
| 4,008,679 | A | | 2/1977 | Bozzano |
| 2002/0017229 | A1 | | 2/2002 | Pavon et al. |
| 2006/0189224 | A1 | | 8/2006 | Longdill et al. |

OTHER PUBLICATIONS

International Search Report for PCT/EP2012/062660 mailed Oct. 2, 2012.

Written Opinion of the International Searching Authority mailed Oct. 2, 2012.

* cited by examiner

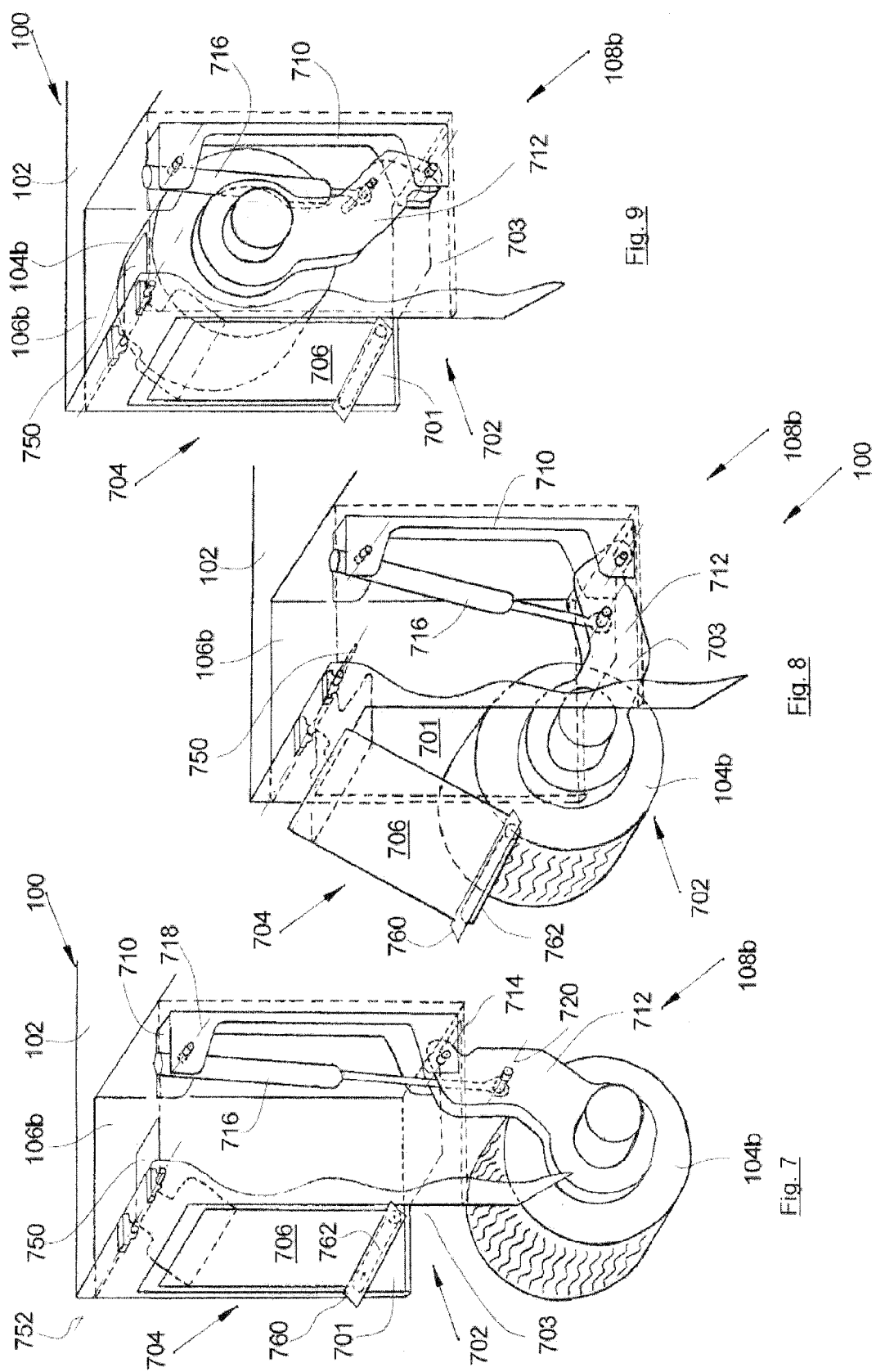

AMPHIBIOUS VEHICLE

The present invention concerns an amphibious vehicle comprising retractable wheels.

An amphibious vehicle of the prior art comprises a plurality of retractable wheels that are generally three or four in number and a chassis that has a housing for each wheel.

Each wheel is mounted on an arm that is secured to the chassis and is able to move in order to pass the wheel from a retracted position to a running position. In the retracted position, the wheel is disposed inside the chassis in order to limit drag when the amphibious vehicle is moving on water and, in the running position, the wheel is disposed outside the chassis in order to support the chassis when the amphibious vehicle is moving on land.

For each housing, the amphibious vehicle has a hatch. Each hatch is thus able to move between an open position in which the wheel is free to enter or leave the housing and a closed position that closes the housing and prevents passage of the wheel.

The locking of each hatch in the closed position is often achieved by complex means with little resistance to swell, which may cause the opening of the hatch when the amphibious vehicle is moving on water.

One aim of the present invention is to propose an amphibious vehicle comprising retractable wheels that does not have the drawbacks of the prior art and in particular enables locking of the hatch that is simple and resistant to swell.

To this end, it is proposed an amphibious vehicle comprising:
- a chassis having at least one housing having an opening having edges,
- for said or each housing, a handling device having a fixed part fixed to the chassis and a movable part mounted so as to be able to move on said fixed part and comprising among other things a wheel, said movable part being able to move between a running position in which said wheel is outside said housing and a retracted position in which said wheel is in said housing, and
- for each opening, a hatch system having a hatch designed to adopt alternately an open position in which said hatch does not close off said opening, and a closed position in which said hatch comes into abutment against the edges of the opening and at least partly closes off said opening, each movable part being designed to be moved into a locking position wherein a locking element of said movable part locks the associated hatch in the closed position by abutment thereof against said hatch.

Advantageously, said locking element is the wheel of said movable part.

According to a particular embodiment, the wheel has a rim, said locking element is said rim, said hatch has a cradle and, in the locking position, the rim is placed on the cradle.

Advantageously, the rim is traversing with respect to the tyre, the cradle consists of two walls, each wall receiving one of the ends of the rim in the locking position.

Advantageously, the hatch is housed inside the housing, and said locking element comes into the locking position in abutment on the internal side of said housing against said hatch.

Advantageously, said hatch system comprises a manoeuvring system comprising a frame on which the hatch is mounted, and movement means designed to move said frame, said frame has an empty space enabling said locking element to pass and to come into abutment against said hatch in the locking position, and the hatch is fixed to the frame by means of a suspension system.

Advantageously, the abutment zone of said locking element in the locked position is concentric with respect to the opening.

Advantageously, the movement means comprise two groove carriers, each disposed on either side of the opening and having a guide groove, and an activation system designed to move the frame along the two grooves.

According to another particular embodiment, said hatch is mounted so as to be able to move in rotation on said chassis about a principal rotation axis, said hatch comprises a tongue extending it beyond the principal rotation axis, and said locking element, in the locking position, comes into abutment against said tongue.

Advantageously, the hatch comprises first means forming a stop consisting of extensions produced at the free end of the hatch and extending transversely towards the outside of the hatch and which are intended to cooperate with the edges of the opening in order to prevent the rotation of said hatch beyond a limit position corresponding to the entry of said hatch in the housing.

Advantageously, a roller is mounted so as to be free to rotate at the free end of the hatch.

The features of the invention mentioned above, as well as others, will emerge more clearly from a reading of the following description of an example embodiment, said description being given in relation to the accompanying drawings, among which:

FIGS. 7 to 9 show a detail of the rear part of the amphibious vehicle of FIG. 1 in various positions of the rear wheel.

Figure 1:
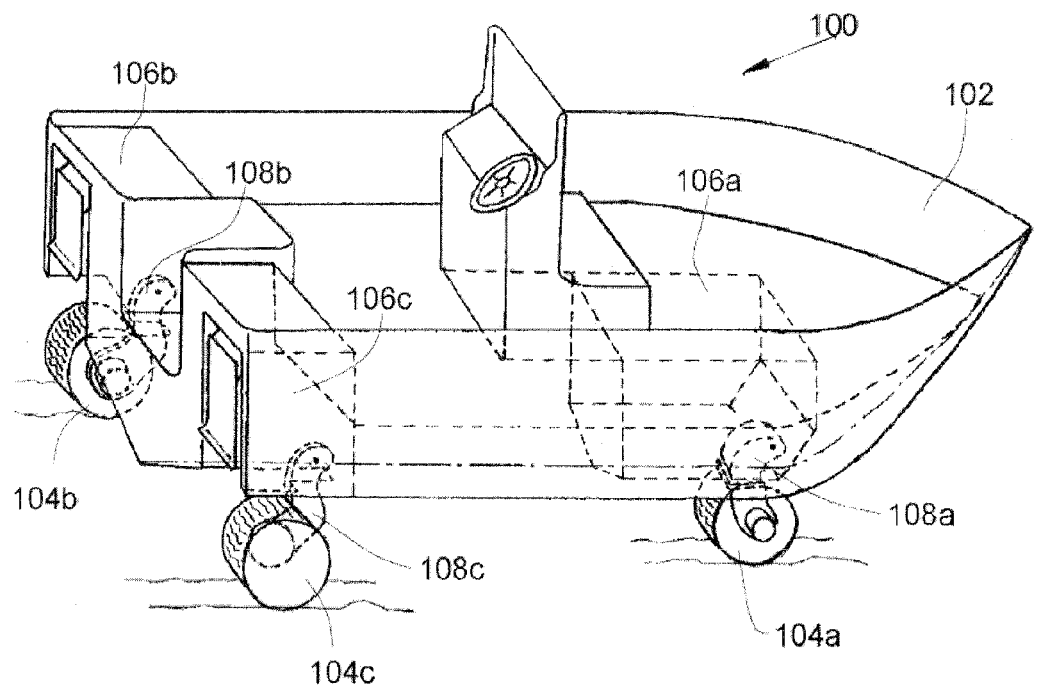
FIG. 1 shows a view of an amphibious vehicle according to the invention.

In the following description, the terms relating to a position are taken with reference to an amphibious vehicle in the position of use, that is to say as shown in FIG. 1.

In the embodiment of the invention presented here, the amphibious vehicle takes the form of a boat, but it could take the form of another type of vehicle such as for example a car.

FIG. 1 shows an amphibious vehicle 100 that comprises a chassis 102 having a plurality of housings 106a-c that are here three in number and for each housing 106a-c a handling device 108a-c having a wheel 104a-c.

The three wheels 104a-c are here distributed between a front wheel 104a and two rear wheels 104b-c, one of which is disposed on the left (104b) and the other one of which is disposed on the right (104c), that is to say on either side of the mid-plane of the amphibious vehicle 100.

Each handling device 108a-c has a fixed part fixed to the chassis 102, and in particular inside the associated housing 106a-c, and a movable part (104a-c) mounted so as to be able to move on the fixed part and comprising among other things said wheel 104a-c.

The movable part 104a-c is able to move between a running position (FIG. 1) wherein the wheel 104a-c is outside the housing 106a-c and supports the chassis 102, and a retracted position (FIGS. 3 to 5, and 9) in which the wheel 104a-c and the movable part are in the housing 106a-c.

Figure 2:
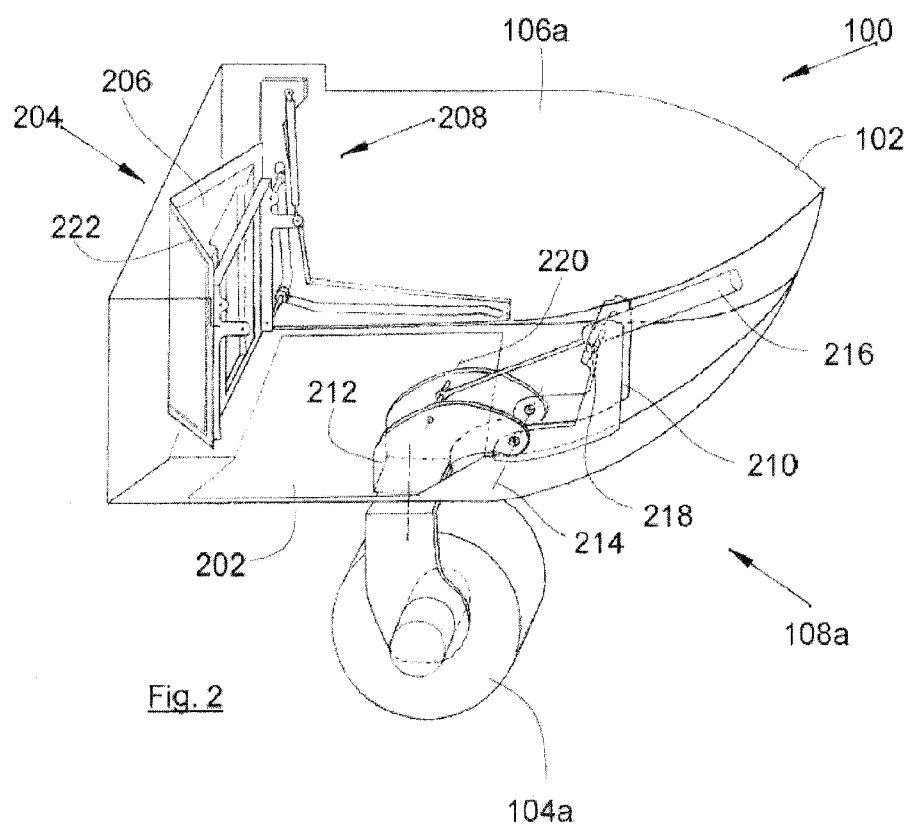
FIGS. 2 to 5 show a detail of the front part of the amphibious vehicle of FIG. 1 in various positions of the front wheel.

FIG. 2 shows the front part of the amphibious vehicle 100. The housing 106a has an opening 202 between the outside and inside of said housing 106a and which enables the front wheel 104a to pass. The opening 202 is here horizontal and produced in the bottom of the chassis 102.

To close the opening 202, the amphibious vehicle 100 has a hatch system 204 comprising a hatch 206 and a manoeuvring system 208 on which said hatch 206 is mounted and which enables the hatch 206 to pass from an open position (FIGS. 2 and 3) wherein the hatch 206 does not close off the opening 202 to a closed position (FIG. 4) wherein the hatch 206 closes off the opening 202.

FIG. 2 shows the amphibious vehicle 100 when the hatch 206 is in the open position and the front wheel 104a is in the running position.

Figure 3:
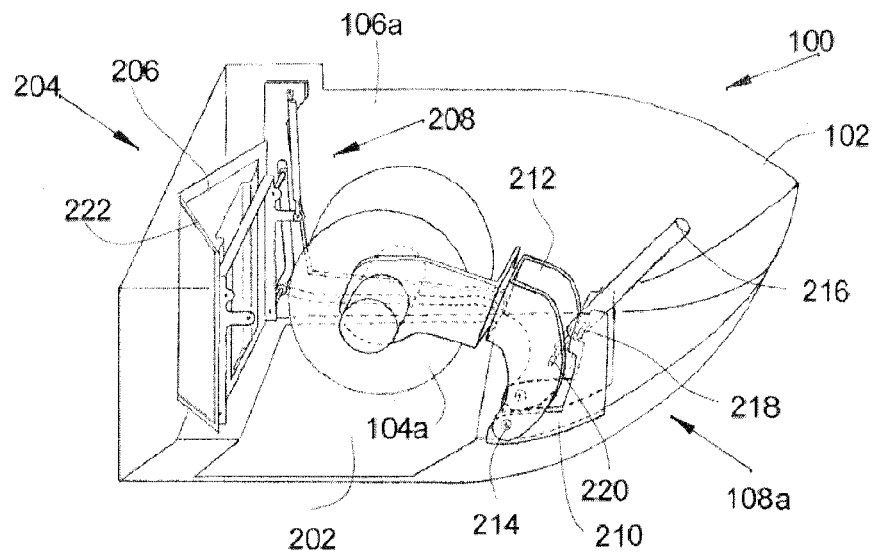

FIG. 3 shows the amphibious vehicle 100 when the hatch 206 is in the open position and the front wheel 104a is in the retracted position.

Figure 4:
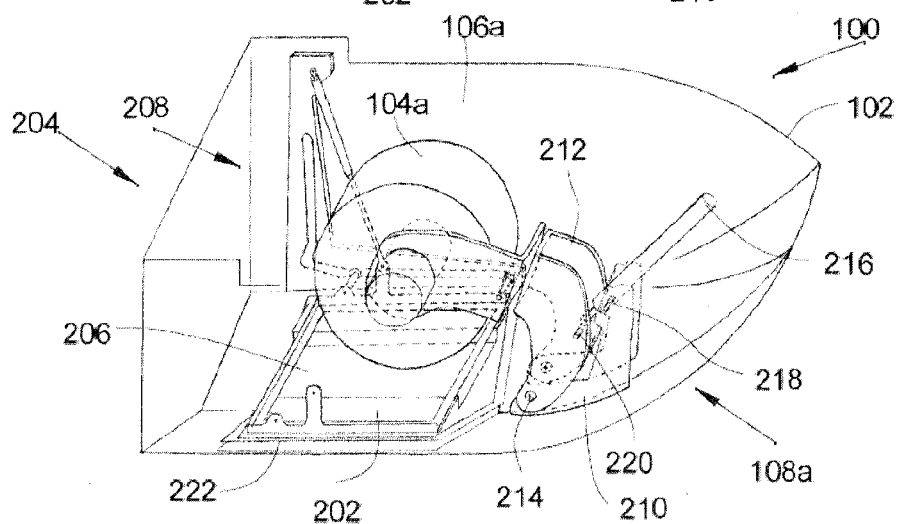
Figure 5:
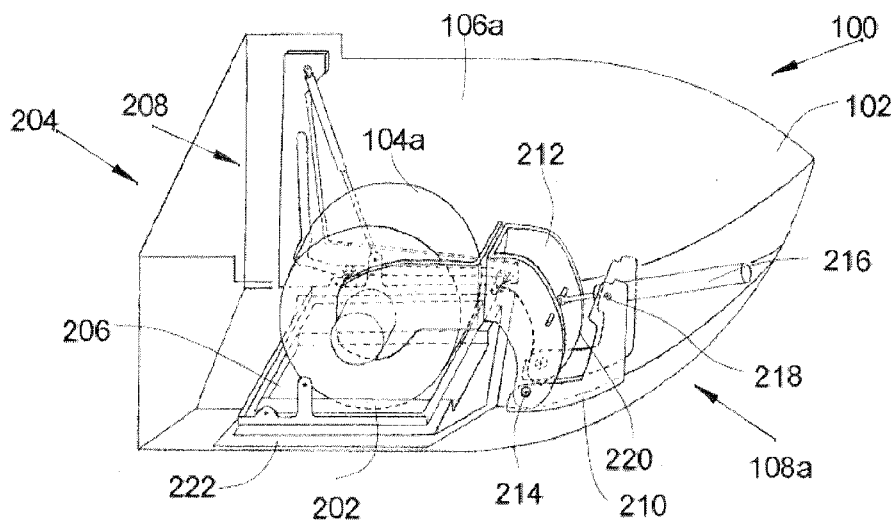

FIG. 4 shows the amphibious vehicle 100 when the hatch 206 is in the closed position and the front wheel 104a is in the retracted position.

To prevent any movement of the hatch 206 in the closed position, the movable part 104a is designed to be moved, particularly from the retracted position, into a locking position (FIG. 5) wherein the movable part 104a locks the hatch 206 in the closed position.

The fixed part comprises a base 210 fixed in the bottom of the chassis 102. The movable part comprises the front wheel 104a, a leg 212 in the vicinity of the opening 202, and an activation means 216. The leg 212 is mounted so as to be able to move in rotation on the base 210 about a first rotation axis 214, which is here perpendicular to the mid-plane. The activation means 216 is here a jack the cylinder of which is mounted so as to be able to move in rotation on the base 210 about a second rotation axis 218 parallel to the first rotation axis 214 and the rod of which is mounted so as to be able to move in rotation on the leg 212 about a third rotation axis 220 parallel to the first rotation axis 214.

In the embodiment of the invention presented here, the movable part 104a, 212, 216 has a locking element that is here the wheel 104a, which, in the locking position, is put in abutment against a locking element 206 of the associated hatch system 204, and which is here the hatch 206. In another embodiment of the invention, it is possible to provide for the locking element to be for example the leg 212 and for the locking element to be another part of the hatch system 204. Thus all the power of the handling device 108a is put in service for locking the hatch 206 and this in the absence of any other additional device. The invention consists here of putting the locking element 104a directly in abutment against the hatch 206, that is to say without the use of an intermediate element.

The base 210 takes the form of an L, the horizontal arm of which is oriented towards the opening 202. The leg 212 is articulated at the horizontal free end of the L and the jack 216 is articulated at the vertical free end of the L.

Thus, when the front wheel 104a is in the running position, activation of the activation means 216 by means of a suitable control system causes the retraction of the rod into the cylinder and therefore the raising of the front wheel 104a in the housing 106a by rotation of the leg 212 about the first rotation axis 214. The front wheel 104a thus passes successively from the position shown in FIG. 2 to the positions in FIGS. 3 and 4.

Conversely, when the front wheel 104a is in the retracted position, activation of the activation means 216 by means of the control system causes the rod to move out of the cylinder, and therefore causes the front wheel 104a to drop out of the housing 106a by rotation of the leg 212 about the first rotation axis 214.

The hatch 206 is able to move inside the housing 106a and, in the closed position, it closes off the opening 202 by being placed above it.

In the locking position, the front wheel 104a is lowered from the retracted position by activation of the activation means 216 and then comes into abutment against the hatch 206 and in particular here against the top face of the hatch 206, which effectively locks its position and makes it watertight.

Conversely, when the front wheel 104a is in the locking position, activation of the activation means 216 raises the front wheel 104a as far as the retracted position shown in FIG. 4, where the front wheel 104a is no longer in contact with the hatch 206 and the latter can therefore be moved to the opening position.

Figure 6:
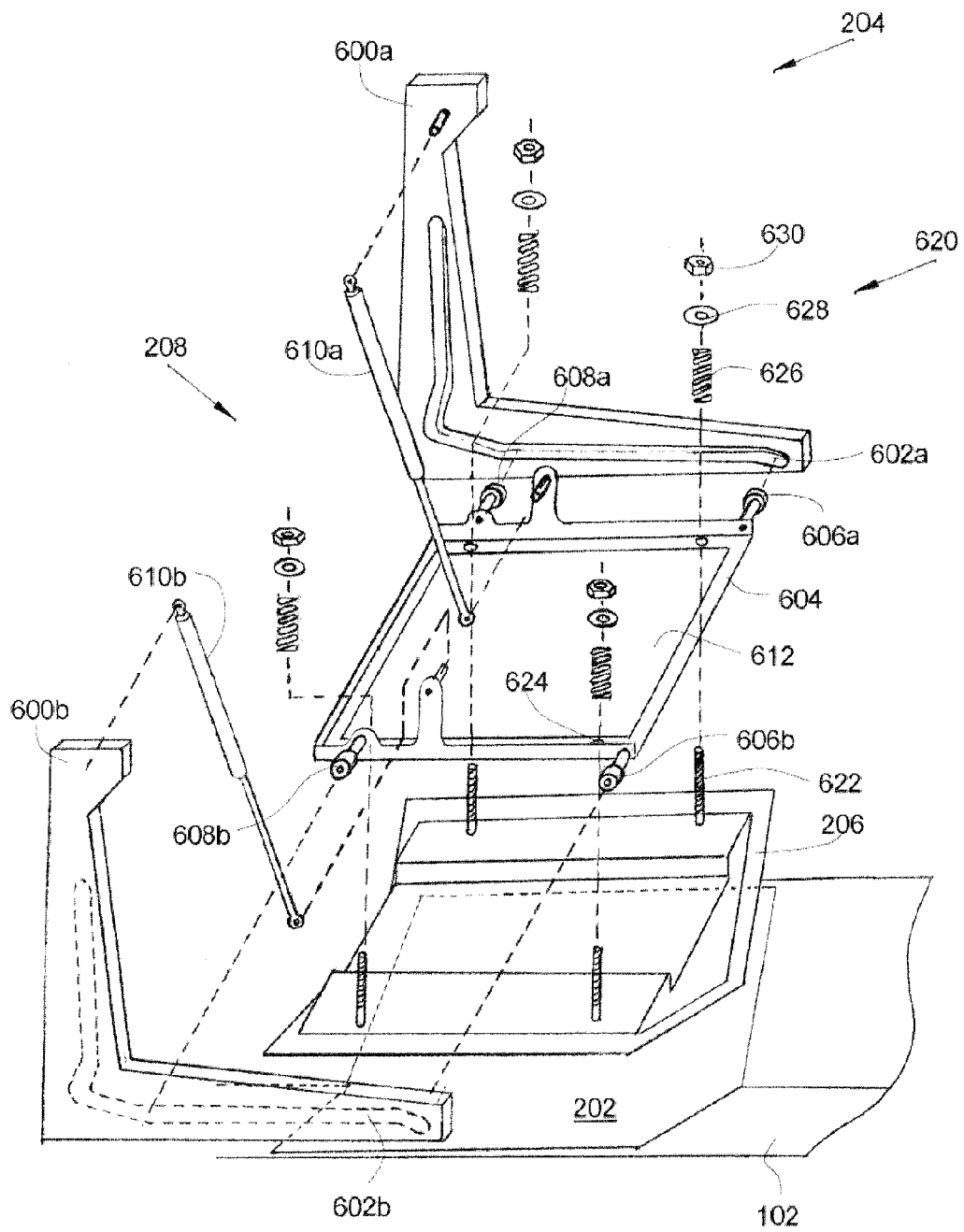
FIG. 6 is an exploded view of a hatch system of the front part of the amphibious vehicle.

FIG. 6 shows a particular embodiment of the hatch system 204 that is disposed inside the housing 106a.

The manoeuvring system 208 is here symmetrical with respect to the mid-plane and comprises:

two groove carriers 600a-b, disposed on either side of the opening 202, having a guide groove 602a-b, each extending here in a vertical plane and facing each other, a frame 604 that extends between the two groove holders 600a-b and comprises, for each groove 602a-b, two running means 606a-b and 608a-b designed to run in said groove 602a-b, and an activation system 610a-b designed to move the frame 604 along the two grooves 602a-b, from a first position corresponding to the open position of the hatch 206 to a second position corresponding to the closed position of the hatch 206, and vice versa.

The two groove carriers 600a-b and the activation system 610a-b form movement means designed to move the frame 604.

The hatch 206 is fixed to the frame 604, which is open, that is to say it has an empty space 612 that enables the front wheel 104a to pass, and more particularly the tyre and abutment thereof against a face of the hatch 206 in the locking position.

To provide resistance to swell that is homogeneous throughout contact of the hatch 206 against the chassis 102, the bearing position of the front wheel 104a is such that the bearing zone of the front wheel 104a on said face in the locking position is centered, and more particularly concentric with respect to the opening 202. Thus the locking force opposed to the swell at the periphery of the opening 202 is everywhere maximum and the force exerted by the front wheel 104a does not tend to create torque in the hatch 206.

The empty space 612 is here substantially centred with respect to the face of the hatch 206 against which the tyre of the front wheel 104 comes into abutment in the locking position.

The frame 604 here takes the form of a framework and the empty space 612 is positioned so as to centre the hatch 206 with respect to the opening 202.

The profiles of each groove 602a-b are adapted to enable the frame 604 and the hatch 206 to move between the open position and the closed position while preventing contacts between the movable parts and the fixed parts of the amphibious vehicle 100. In the embodiment of the invention presented here, the grooves 602a-b are designed so that, in the closed position, the hatch 206 is placed horizontally, and so that in the open position the hatch 206 is placed vertically.

The activation system 610a-b here consists of two jacks 610a-b that are synchronised with each other.

Each jack 610a-b is fixed by pivot connections the rotation axes of which are perpendicular to the mid-plane, first by its cylinder to a fixed element of the amphibious vehicle 100 that is here one of the groove holders 600a-b and second by its rod to the frame 604.

To ensure good watertightness and contact between the edges of the opening 202 and hatch 206, the latter is fixed to the frame 604 by means of a suspension system 620 that allows movement of the hatch 206 with respect to the frame 604.

The dimensions of the hatch 206 are such that it cannot pass through the opening 202. Thus, when the front wheel 104a bears on the hatch 206 in the closed position, the latter goes in and comes to bear against the edges of the opening 202. The edges of the opening 202 thus form a stop for the hatch 206.

To ensure good watertightness and to facilitate contact between the hatch 206 and the edges of the opening 202, a peripheral seal 222 is placed between the hatch 206 and the edges of the opening 202. The peripheral seal 222 can be fixed to the hatch 206 or to the edges of the opening 202.

In the embodiment of the invention presented here, the suspension system 620 comprises:

four threaded rods 622 fixed to the hatch 206, the free ends of which are designed to pass through piercings 624 that the frame 604 has for this purpose, for each threaded rod 622, a compression spring 626 that is fitted on the threaded rod 622 after the latter has itself been fitted in the piercing 624, for each compression spring 626, a washer 628 that is fitted on the threaded rod 622 after the compression spring 626 is positioned, and for each washer 628, a nut 630 that is screwed onto the threaded rod 622 after the fitting of the washer 628.

Thus, when the front wheel 104a bears on the hatch 206 moves with respect to the frame 604 because of the compression of the compression springs 626.

Release of the pressure exerted by the front wheel 104a causes the raising of the hatch 206, which is detached from the edges of the opening 202.

In the case of an amphibious vehicle 100 the chassis 102 of which takes the form of a boat hull, the hatch 206 advantageously takes a form that extends the hull in order to limit drag during sailing.

To empty any water that might have been introduced into the housing 106a, a pump may be provided.

Figure 6B:
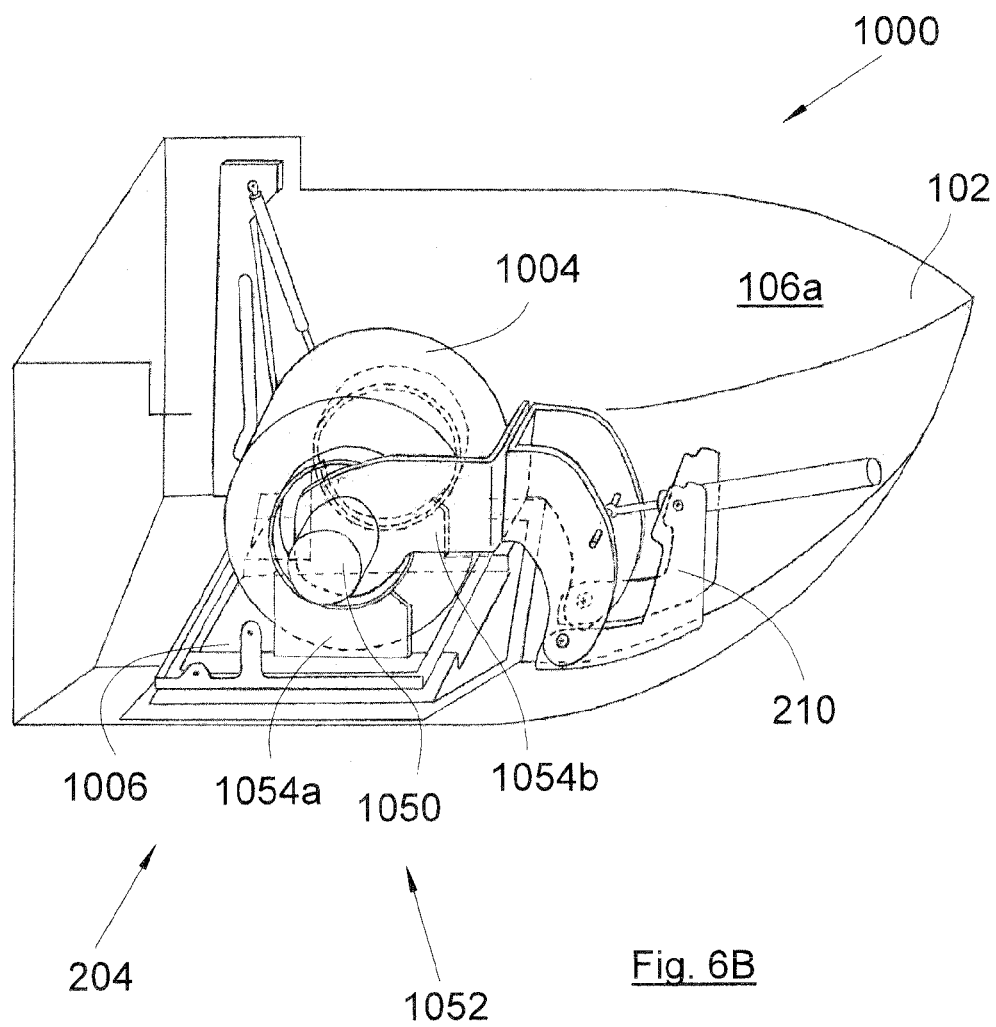
FIG. 6B shows a variant of the invention.

FIG. 6B shows an amphibious vehicle 1000 wherein the wheel 1004 conventionally has a rim 1050. The locking element of the movable part 1004 is then the rim 1050 of the wheel 1004. Use of the rim 1050 prevents, if the tyre deforms, swell against the hatch 1006 being too powerful, prevents the hatch 1006 from partly opening and prevents water entering the housing 106a. The rim 1050 comes into the locking position in abutment on the internal side of the housing 106a against the hatch 1006. The invention thus consists of putting the locking element 1050 directly in abutment against the hatch 1006, that is to say without the use of an intermediate element.

To enable the rim 1050 to bear on the hatch 1006, the latter has a cradle 1052 on which the rim 1050 is placed in the locking position.

For balancing reasons, the rim 1050 is traversing with respect to the tyre and the cradle 1052 consists of two walls 1054a-b that are here parallel to the longitudinal symmetry plane of the vehicle and oriented towards the inside of the housing 106a, each wall 1054a-b receiving one of the ends of the rim 1050 in the locking position.

In this embodiment, the hatch system also comprises a manoeuvring system with a suspension system that are in accordance with those of the embodiment in FIG. 6 and the cradle 1052 passes through the empty space in order to receive the rim 1050.

FIG. 7 shows the rear part of the amphibious vehicle 100. The housing 106b has an opening 702 between the outside and inside of said housing 106b that enables the rear wheel 104b to pass when it is manoeuvred.

In the embodiment of the invention presented here, the housing 106b takes the form of a rectangular parallelepiped and the opening 702 extends over two faces of this parallelepiped, and more particularly on a vertical face and on a horizontal face. The opening 702 is therefore broken down between a vertical opening 701 and a horizontal opening 703.

To at least partly close the opening 702, and in particular the vertical opening 701, the amphibious vehicle 100 has a hatch system 704 that comprises a hatch 706 that is mounted so as to be able to move in rotation on the chassis 102 about a principal rotation axis 752 between an open position (FIG. 8) wherein the hatch 706 does not close off the vertical opening 701 and a closed position (FIGS. 7 and 9) wherein the hatch 706 closes off the vertical opening 701.

FIG. 7 shows the amphibious vehicle 100 when the hatch 706 is in the closed position and the rear wheel 104b is in the running position.

FIG. 8 shows the amphibious vehicle 100 when the hatch 706 is in the open position and the rear wheel 104b is in the process of being moved towards the retracted position.

To prevent any movement of the hatch 706 in the closed position, the movable part 104b-c is designed to be moved, from the retracted position, into a locking position (FIG. 9) wherein the movable part 104b-c locks the hatch 706 in the closed position.

The fixed part comprises a base 710 fixed to the chassis 102. The movable part comprises the wheel 104b-c, a leg 712 in the vicinity of the opening 702, and an activation means 716. The leg 712 is mounted so as to be able to move in rotation on the base 710 about a first rotation axis 714 that is here perpendicular to the mid-plane. The activation means 716 is here a jack, the cylinder of which is mounted so as to be able to move in rotation on the base 710 about a second rotation axis 718 parallel to the first rotation axis 714 and the rod of which is mounted so as to be able to move on the leg 712 about a third rotation axis 720 parallel to the first rotation axis 714.

In the embodiment of the invention presented here, the movable part 104b-c, 712, 716 has a locking element that is here the wheel 104b-c which, in the locking position, is placed in abutment against a locking element 750 of the associated hatch system 704. In another embodiment of the invention, it is possible to provide for the locking element to be for example the leg 714. Thus all the power of the handling device 108b-c is used for locking the hatch 706, and this in the absence of any other additional device. The invention thus consists of putting the locking element 104b-c in abutment directly against the hatch 706, that is to say without the use of an intermediate element.

The base 710 takes the form of a U fixed vertically against the vertical wall of the housing 106b that faces the hatch 706. The leg 714 is articulated at one of the free ends of the U and the jack 716 is articulated at the other free end of the U.

Thus, when the rear wheel 104b is in the running position, activation of the activation means 716 by means of the control system causes retraction of the rod into the cylinder and therefore the lifting of the rear wheel 104b into the housing 106b by rotation of the leg 712 about the first rotation axis 714. The rear wheel 104b thus passes successively from the position shown in FIG. 7 to the positions in FIGS. 8 and 9.

Conversely, when the rear wheel 104b is in the retracted position, activation of the activation means 716 by means of the control system causes the rod to emerge out of the cylinder and therefore causes the rear wheel 104*b* to drop out of the housing 106*b* by rotation of the leg 712 about the first rotation axis 714.

The hatch 706 is able to move outside the housing 106*b* and in the closed position it closes off the vertical opening 701.

The hatch system 704 has a tongue 750 secured to the hatch 706 and which extends it beyond the principal rotation axis 752, that is to say, with respect to a vertical plane perpendicular to the mid-plane and passing through the principal rotation axis 752, the tongue 750 is disposed on one side of this vertical plane and the hatch 706 is disposed on the other side of this vertical plane. The tongue 750 constitutes the locking element 750 of the hatch system 704. It is possible to provide for the locking element to be another part of the hatch system 704.

In the locking position, the rear wheel 104*b* is raised until it comes into abutment against the tongue 750 of the hatch system 704.

The hatch system 704 comprises first means forming a stop and the chassis 102 comprises second means forming a stop that cooperate with the first means forming a stop in order to prevent rotation of the hatch 706 beyond a limit position corresponding to the entry of the hatch 706 into the housing 106*b*.

Thus, when the rear wheel 104*b* comes into abutment against the tongue 750, the first means forming a stop and the second means forming a stop cooperate in order to prevent the rotation of the hatch 706 beyond its limit position and thus lock the hatch 706, which effectively locks its position.

Conversely, when the rear wheel 104*b* is in the locking position, activation of the activation means 716 lowers the rear wheel 104*b*, which releases the tongue 750 and therefore the hatch 706, which is free to pivot to enable the rear wheel 104*b* to pass to the running position.

In the embodiment of the invention presented here, the first means forming a stop are formed by extensions 760 produced at the free end of the hatch 706 and which extend transversely towards the outside of the hatch 706, and the second means forming a stop are formed by the edges of the vertical opening 701. The extensions 760 come into abutment against the edges of the vertical opening 701, as shown in FIGS. 7 and 9, which prevents rotation of the hatch 706 towards the inside of the housing 106*b*.

In another embodiment of the invention not shown here, the first means forming a stop are formed by the tongue 750 and the second means forming a stop are formed by a wall of the housing 106*b*, here the top horizontal wall. The tongue 750 comes into abutment against the wall, which prevents rotation of the hatch 706 towards the inside of the housing 106*b*.

The hatch 706 opens under the action of the rear wheel 104*b* and, in order to facilitate such opening, a roller 762 is mounted so as to be free to rotate at the free end of the hatch 706. When the rear wheel 104*b* rises again, it comes into contact with the roller 762, which rolls on the rear wheel 104*b* as the latter progresses.

Naturally, the present invention is not limited to the examples and embodiments described and depicted but is capable of numerous variants accessible to persons skilled in the part.

The invention claimed is:

1. Amphibious vehicle (100, 1000) comprising:
   a chassis (102) having at least one housing (106*a-c*) having an opening (202, 702) having edges,
   for said or each housing (106*a-c*), a handling device (108*a-c*) having a fixed part (210, 710) fixed to the chassis (102) and a movable part (104*a-c*, 212, 216, 712, 716, 1004) mounted so as to be able to move on said fixed part (210, 710) and comprising among other things a wheel (104*a-c*, 1004), said movable part (104*a-c*, 212, 216, 712, 716, 1004) being able to move between a running position (FIG. 1) in which said wheel (104*a-c*, 1004) is outside said housing (106*a-c*), and a retracted position (FIGS. 3 to 5, 9 and 6B) in which said wheel (104*a-c*, 1004) is in said housing (106*a-c*), and
   for each opening (202, 702), a hatch system (204, 704) having a hatch (206, 706, 1006), designed to adopt alternately an open position (FIGS. 2, 3 and 8) in which said hatch (206, 706, 1006) does not close off said opening (202, 702) or a closed position (FIGS. 5, 9 and 6B) in which said hatch (206, 706, 1006) comes into abutment against the edges of the opening (202, 702) and at least partly closes off said opening (202, 702),
   each movable part (104*a-c*, 212, 216, 712, 716, 1004) being designed to be moved into a locking position wherein a locking element (104*a-c*, 1050) of said movable part (104*a-c*, 212, 216, 712, 716, 1004) locks the associated hatch (206, 706, 1006) in the closed position by abutment thereof against said hatch (206, 706, 1006).

2. Amphibious vehicle (100, 1000) according to claim 1, characterised in that said locking element is the wheel (104*a-c*, 1050) of said movable part (104*a-c*, 212, 216, 712, 716, 1004).

3. Amphibious vehicle (1000) according to claim 2, characterised in that the wheel (1004) has a rim (1050), in that said locking element is said rim (1050), in that said hatch has a cradle (1052) and in that, in the locking position, the rim (1050) is placed on the cradle (1052).

4. Amphibious vehicle (1000) according to claim 3, characterised in that the rim (1050) is traversing with respect to a tire, in that the cradle (1052) consists of two walls (1054*a-b*), each wall (1054*a-b*) receiving one of the ends of the rim (1050) in the locking position.

5. Amphibious vehicle (100, 1000) according to claim 1, characterised in that the hatch (206, 1006) is housed inside the housing (106*a*), and in that said locking element (104*a*, 1004) comes into the locking position in abutment on the internal side of said housing (106*a*) against said hatch (206, 1006).

6. Amphibious vehicle (100, 1000) according to claim 1, characterised in that said hatch system (204) comprises a maneuvering system (208) comprising a frame (604) on which the hatch (206, 1006) is mounted, and movement means designed to move said frame (604), in that said frame (604) has an empty space (612) enabling said locking element (104*a*, 1004) to pass and to come into abutment against said hatch (206, 1006) in the locking position, and in that the hatch (206, 1006) is fixed to the frame (604) by means of a suspension system (620).

7. Amphibious vehicle (100, 1000) according to claim 6, characterised in that an abutment zone of said locking element (104*a*) in the locked position is concentric with respect to the opening (202).

8. Amphibious vehicle (100) according to claim 6, characterised in that the movement means comprise two groove carriers (600*a-b*), each disposed on either side of the opening (202) and having a guide groove (602*a-b*), and an activation system (610*a-b*) designed to move the frame (604) along the two grooves (602*a-b*).

9. Amphibious vehicle (100) according to claim 1, characterised in that said hatch (706) is mounted so as to be able to move in rotation on said chassis (102) about a principal rotation axis (752), in that said hatch (706) comprises a tongue (750) extending it beyond the principal rotation axis (752), and in that said locking element (104a-c), in the locking position, comes into abutment against said tongue (750).

10. Amphibious vehicle (100) according to claim 9, characterised in that the hatch (706) comprises first means forming a stop consisting of extensions (760) produced at a free end of the hatch (706) and extending transversely towards the outside of the hatch (706) and which are intended to cooperate with the edges of the opening (702) in order to prevent the rotation of said hatch (706) beyond a limit position corresponding to the entry of said hatch (706) in the housing (106b-c).

11. Amphibious vehicle (100) according to claim 9, characterised in that a roller (762) is mounted so as to be free to rotate at a free end of the hatch (706).

\* \* \* \* \*